(12) United States Patent
Yoshisako et al.

(10) Patent No.: US 12,027,927 B2
(45) Date of Patent: Jul. 2, 2024

(54) CORE PART MANUFACTURING METHOD AND CORE PART MANUFACTURING APPARATUS OF ROTARY ELECTRIC MACHINE

(71) Applicant: MITSUI HIGH-TEC, INC., Fukuoka (JP)

(72) Inventors: Shohei Yoshisako, Fukuoka (JP); Kohei Yoshida, Fukuoka (JP); Hibiki Mino, Fukuoka (JP); Masayuki Ono, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 294 days.

(21) Appl. No.: 17/581,349

(22) Filed: Jan. 21, 2022

(65) Prior Publication Data

US 2022/0247289 A1 Aug. 4, 2022

(30) Foreign Application Priority Data

Jan. 29, 2021 (JP) .................................. 2021-013077

(51) Int. Cl.
*H02K 15/12* (2006.01)
*H02K 15/03* (2006.01)
*H02K 1/276* (2022.01)

(52) U.S. Cl.
CPC ............ *H02K 15/12* (2013.01); *H02K 15/03* (2013.01); *H02K 1/276* (2013.01); *Y10T 29/49012* (2015.01)

(58) Field of Classification Search
CPC ........ H02K 15/03; H02K 1/276; H02K 15/12; H02K 1/27; H02K 15/02; Y10T 29/49012
USPC .................................. 29/598, 596, 607, 609
See application file for complete search history.

(56) References Cited

U.S. PATENT DOCUMENTS 10,873,249 B2 * 12/2020 Okudaira ............... H02K 1/276
11,258,340 B2 * 2/2022 Ikeda ..................... H02K 15/03

FOREIGN PATENT DOCUMENTS

JP 2009-100634 5/2009

* cited by examiner

*Primary Examiner* — Thiem D Phan
(74) *Attorney, Agent, or Firm* — GREENBLUM & BERNSTEIN, P.L.C.

(57) ABSTRACT

There are provided core part manufacturing method and apparatus for manufacturing a core part of a rotary electric machine. The core part manufacturing method includes: injecting a molten resin from a side on one end surface of an iron core body into a plurality of space portions provided in the iron core body in a state where the iron core body is sandwiched and pressed. In injecting of the resin, a contact surface on an opposite side to a side where the resin is injected includes: a relief portion that is recessed without contacting to the one end surface; and a remaining portion that is adjacent to a non-contact region. The remaining portion is disposed in the contact surface on an outer peripheral side from the non-contact region, and the relief portion is disposed further in the contact surface on an outer peripheral side from the remaining portion.

14 Claims, 13 Drawing Sheets

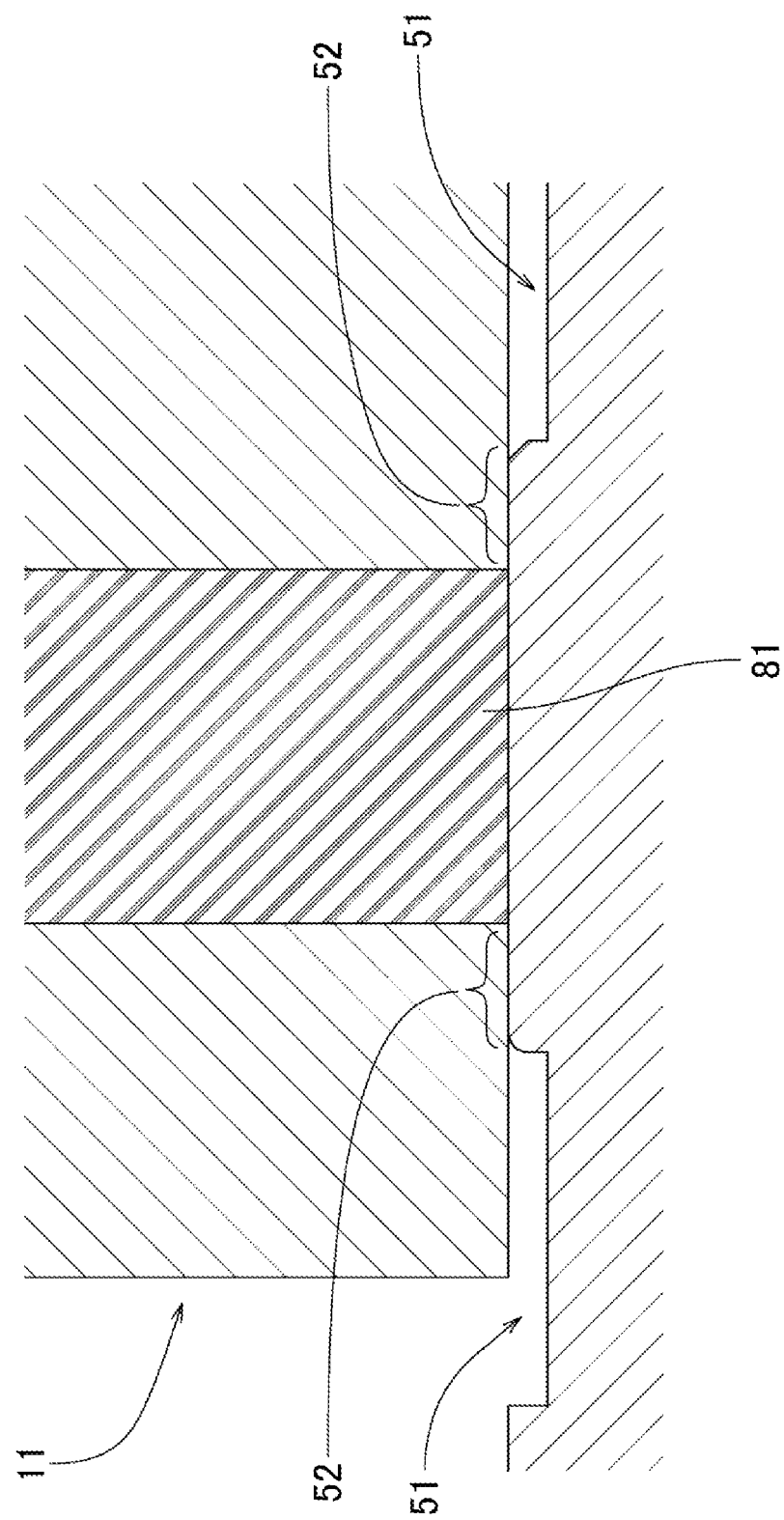

CORE PART MANUFACTURING METHOD AND CORE PART MANUFACTURING APPARATUS OF ROTARY ELECTRIC MACHINE

CROSS-REFERENCE TO RELATED APPLICATIONS

This application is based on and claims priority under 35 USC 119 from Japanese Patent Application No. 2021-013077 filed on Jan. 29, 2021, the contents of which are incorporated herein by reference.

TECHNICAL FIELD

The present disclosure relates to a core part manufacturing method and a core part manufacturing apparatus in a rotor of a rotary electric machine.

BACKGROUND ART

In a stator or a rotor of a rotary electric machine such as an electric motor or a generator, a laminated iron core is generally used as a core in which a coil or a permanent magnet is disposed.

In order to dispose the coil and the permanent magnet in the core of such a laminated iron core, various contrivances have been made in related art.

For example, in the case of the core of the rotor, in particular, in the case of a rotor core of an IPM motor, a structure in which a magnet is inserted and fixed in a magnet insertion hole of the laminated iron core has been adopted. In this structure, when the permanent magnet is fixed, after the permanent magnet is inserted into the magnet insertion hole, a resin such as a thermosetting resin in a molten and flowable state is injected into a gap excluding a portion where the permanent magnet is present in the magnet insertion hole to fill the gap, and then the resin is solidified, thereby fixing the permanent magnet.

An example of core manufacturing in such a related-art rotary electric machine is disclosed in JP2009-100634A.

SUMMARY OF INVENTION

Manufacturing of the core of a related-art rotary electric machine is performed by a method disclosed in JP2009-100634A, and by using a resin injection device that injects a resin into a magnet accommodating hole of the rotor core that is sandwiched and pressed by an upper mold and a lower mold, the resin can be efficiently injected into the magnet accommodating hole, and the core and the magnet can be integrated.

In the related-art resin injection for fixing the magnet to the core, the resin injection is generally performed in a state in which the core is sandwiched and pressed between the upper mold and the lower mold of the resin injection device directly or via a jig. However, when the resin is injected into the hole for accommodating the magnet in such a step of injecting the resin into the core, the resin may leak out from the hole and enter a place between an end surface of the core and a contact surface of the mold or the jig in contact with the end surface of the core at the end surface of the core opposite to a side where the resin is injected, and the resin may reach an outside of an outer peripheral portion of the core. When the resin reaches the outside of the outer peripheral portion of the core, the resin becomes burrs after being cured, and removal from the core is indispensable. Therefore, there is a problem that labor and cost of removal work are newly required.

It can be assumed that the leakage of the resin described above occurs due to the fact that the end surface of the core that is not strictly flat due to a pressing force from the mold at the time of injecting the resin is not completely brought into close contact with the flat mold or the contact surface of the jig and a gap remains. For this reason, it is also conceivable to further increase the pressing force of the mold at the time of resin injection to increase adhesion between the end surface of the core and the contact surface of the mold or the jig, thereby eliminating the gap. However, while increasing the pressing force of the mold when injecting the resin can be expected to reduce the leakage of resin, it is difficult to adopt it because excessive force is applied to the core and deformation such as an indentation may occur.

The present disclosure provides a core part manufacturing method and a core part manufacturing apparatus in which, when a resin is injected into an iron core body space portion, a relief portion is provided on a contact surface in a plate portion of a mold or a jig, the contact surface being in contact with an iron core body end surface on a side opposite to a side where the resin is injected, the contact surface pressure is increased by narrowing a contact area between the contact surface and the iron core body end surface, and leakage of the resin between the contact surface and the iron core body end surface is suppressed.

According to an aspect of the present disclosure, a core part manufacturing method for manufacturing a core part that is formed as a rotor of a rotary electric machine includes: providing an iron core body formed by laminating a plurality of thin plates made of a magnetic metal material; sandwiching and pressing the iron core body with an upper mold and a lower mold; and injecting a molten resin from a side on one end surface of the iron core body in a laminating direction of the thin plates into a plurality of space portions provided in the iron core body in a state where the iron core body is sandwiched and pressed. In an operation of injecting the resin, a contact surface that is in contact with the one end surface of the iron core body is provided on an opposite side to a side where the resin is injected into the space portions of the iron core body, the contact surface includes: a non-contact region that faces the space portions of the iron core body; a relief portion that is recessed without contacting to the one end surface; and a remaining portion that is adjacent to the non-contact region and does not become the relief portion, and the remaining portion is disposed in the contact surface on an outer peripheral side from the non-contact region, and the relief portion is disposed further in the contact surface on an outer peripheral side from the remaining portion.

According to the above aspect of the present disclosure, when the resin is injected into the space portion to be filled with the resin of the iron core body, the relief portion is provided on at least the outer peripheral side of the non-contact region facing the space portion of the iron core body on the contact surface that is in contact with the end surface of the iron core body on the side opposite to the resin injection side, and only the remaining portion adjacent to the non-contact region is brought into contact with the iron core body end surface when the resin is injected. Therefore, a contact area between the iron core body and the contact surface is reduced in the relief portion, the contact surface pressure in the remaining portion along the non-contact region is relatively increased, the remaining portion intensively presses the periphery of the space portion of the iron core body to block the resin, the advancing of the resin toward the iron core body outer peripheral side can be prevented, the leakage of the resin reaching an outer peripheral side of the iron core body can be prevented, the cured burr of the leaked resin can be prevented from protruding from the outer periphery of the iron core body, a burr removing step, a burr image inspection step, or the like are unnecessary, and a manufacturing cost of the core part can be suppressed.

According to another aspect of the present disclosure, a core part manufacturing apparatus for manufacturing a core part that is formed as a rotor of a rotary electric machine by injecting a resin into a plurality of space portions provided in an iron core body formed by laminating a plurality of thin plates made of a magnetic metal material includes: an injection mechanism portion configured to inject the molten resin into the space portions of the iron core body in a state of sandwiching and pressing the iron core body with a pair of molds in a laminating direction of the thin-plate; and a jig that is carried in and out together with the iron core body, and sandwiched and pressed between the pair of molds while supporting the iron core body. The injection mechanism portion is configured to inject the resin from a side on an upper end surface of the iron core body in the laminating direction of the thin-plate into the space portions having a through-hole shape continuous in the laminating direction. The jig includes a plate portion configured to support the iron core body in a state where the jig is in contact with a lower end surface of the iron core body in the laminating direction. In a state where the resin is injected, the plate portion includes: a contact surface that is in contact with one end surface of the iron core body on an opposite side to a side where the resin is injected into the space portions of the iron core body, the contact surface includes: a non-contact region that faces the space portions of the iron core body; a relief portion that is recessed without contacting to the one end surface; and a remaining portion that is adjacent to the non-contact region and does not become the relief portion, and the remaining portion is disposed in the contact surface on an outer peripheral side from the non-contact region, and the relief portion is disposed further in the contact surface on an outer peripheral side from the remaining portion.

According to another aspect of the present disclosure, a core part manufacturing apparatus for manufacturing a core part that is formed as a rotor of a rotary electric machine by injecting a resin into a plurality of space portions provided in an iron core body formed by laminating a plurality of thin plates made of a magnetic metal material includes: an injection mechanism portion configured to inject the molten resin into the space portions of the iron core body in a state of sandwiching and pressing the iron core body with a pair of an upper mold and a lower mold in a laminating direction of the thin-plate; and a jig that is carried in and out together with the iron core body, and sandwiched and pressed between the pair of the upper mold and the lower mold while supporting the iron core body. The injection mechanism portion is configured to inject the resin from a side on a lower end surface of the iron core body in the laminating direction of the thin-plate into the space portions having a through-hole shape continuous in the laminating direction. The jig includes a plate portion configured to support the iron core body in a state where the jig is in contact with the lower end surface of the iron core body in the laminating direction. In a state where the resin is injected, the upper mold includes: a contact surface that is in contact with one end surface of the iron core body on an opposite side to a side where the resin is injected into the space portions of the iron core body, the contact surface includes: a non-contact region that faces the space portions of the iron core body; a relief portion that is recessed without contacting to the one end surface; and a remaining portion that is adjacent to the non-contact region and does not become the relief portion, and the remaining portion is disposed in the contact surface on an outer peripheral side from the non-contact region, and the relief portion is disposed further in the contact surface on an outer peripheral side from the remaining portion.

According to another aspect of the present disclosure, a core part manufacturing apparatus for manufacturing a core part that is formed as a rotor of a rotary electric machine by injecting a resin into a plurality of space portions provided in an iron core body formed by laminating a plurality of thin plates made of a magnetic metal material includes: an injection mechanism portion configured to inject the molten resin into the space portions of the iron core body in a state of sandwiching and pressing the iron core body with a pair of an upper mold and a lower mold in a laminating direction of the thin-plate; a plate-shaped auxiliary plate provided abutably on an upper end surface of the iron core body in the laminating direction of thin-plate and the upper mold; and a jig that is carried in and out together with the iron core body, and sandwiched and pressed between the pair of the upper mold and the lower mold while supporting the iron core body. The injection mechanism portion is configured to inject the resin from a side on a lower end surface of the iron core body in the laminating direction of the thin-plate into the space portions having a through-hole shape continuous in the laminating direction. The jig includes a plate portion configured to support the iron core body in a state where the jig is in contact with the lower end surface of the iron core body in the laminating direction. In a state where the resin is injected, the auxiliary plate includes: a contact surface that is in contact with one end surface of the iron core body on an opposite side to a side where the resin is injected into the space portions of the iron core body, the contact surface includes: a non-contact region that faces the space portions of the iron core body; a relief portion that is recessed without contacting to the one end surface; and a remaining portion that is adjacent to the non-contact region and does not become the relief portion, and the remaining portion is disposed in the contact surface on an outer peripheral side from the non-contact region, and the relief portion is disposed further in the contact surface on an outer peripheral side from the remaining portion.

BRIEF DESCRIPTION OF DRAWINGS

FIG. 13 is an illustrative view of illustrating an abutting state between a main portion of a plate portion or a main portion of an auxiliary plate of a jig and an iron core body end surface at the time of injection of a molten resin in a core part manufacturing apparatus according to another embodiment of the present disclosure.

DESCRIPTION OF EMBODIMENTS

1. First Embodiment

Figure 1:
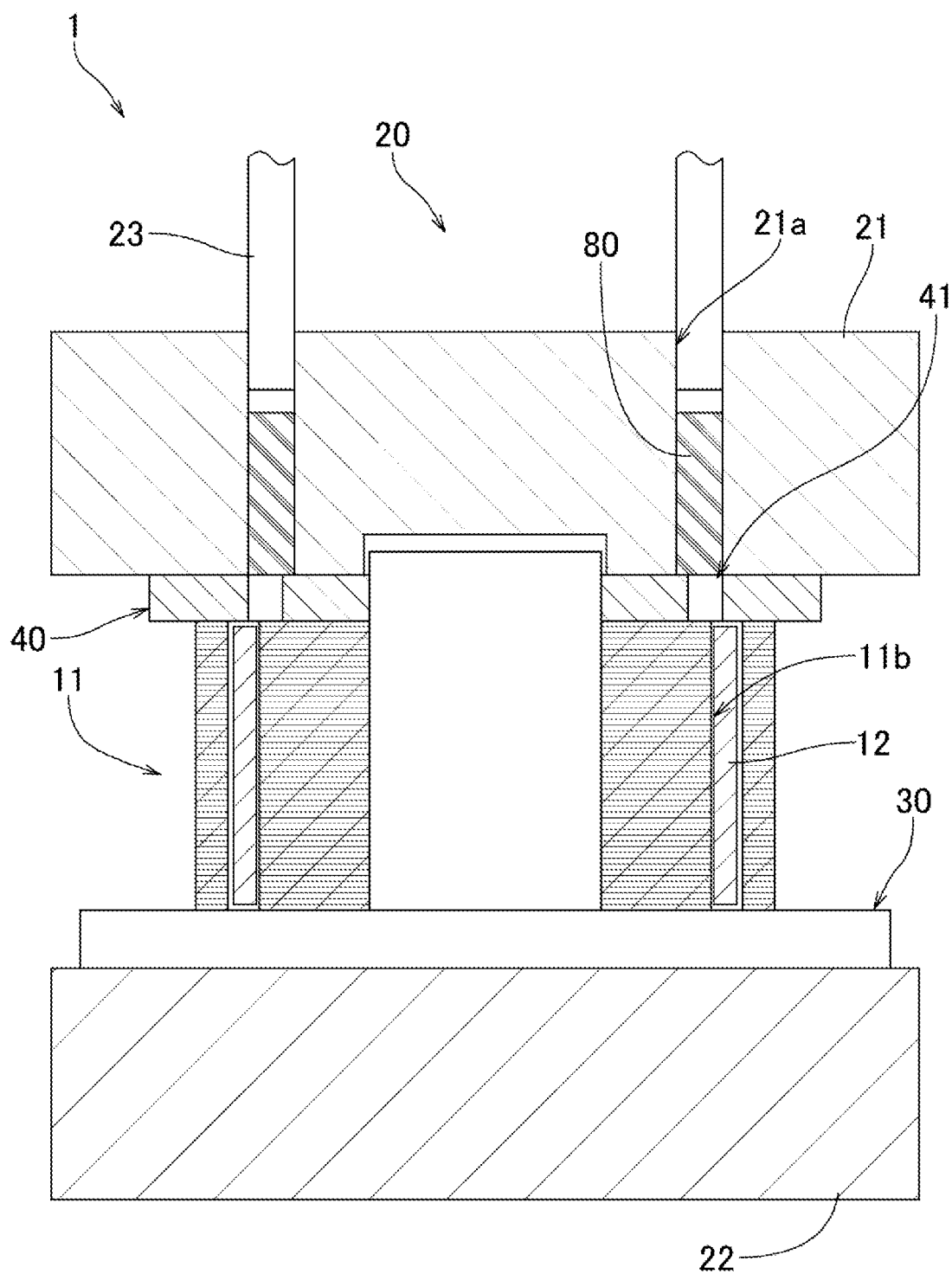
FIG. 1 is a schematic configuration diagram of a core part manufacturing apparatus according to a first embodiment of the present disclosure.
Figure 2:
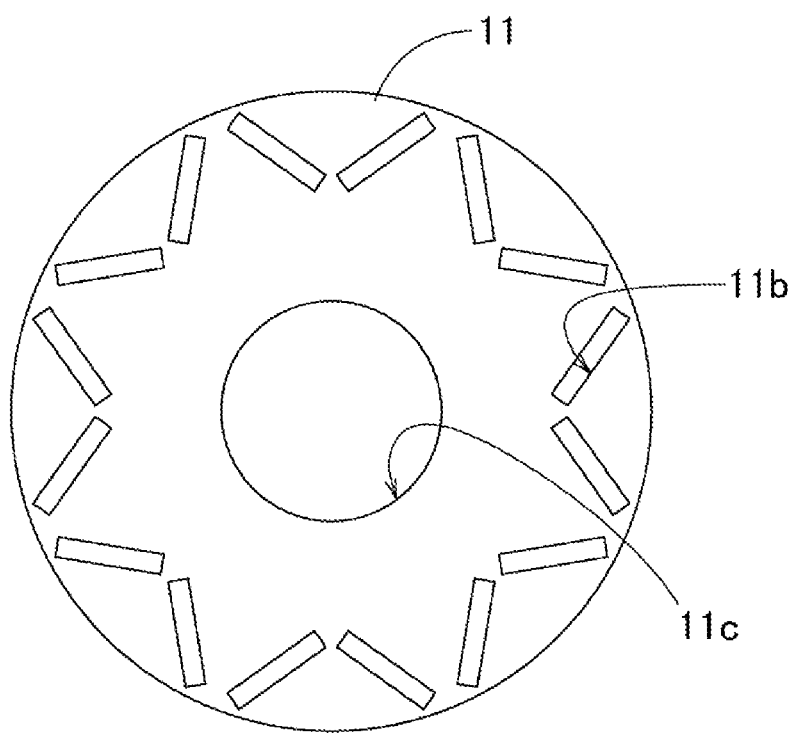
FIG. 2 is a plan view of an iron core body to be resin-injected by the core part manufacturing apparatus according to the first embodiment of the present disclosure.

Hereinafter, a core part manufacturing apparatus for a rotary electric machine according to a first embodiment of the present disclosure will be described with reference to FIGS. 1 to 5, FIGS. 6A and 6B, and FIGS. 7A and 7B.

In each of the drawings, a core part manufacturing apparatus 1 according to the present embodiment is configured to manufacture a core part 10 forming a rotor of a rotary electric machine by filling a molten resin into a plurality of space portions to be filled with a resin in an iron core body 11 having the laminated structure and solidifying the molten resin. Specifically, the core part manufacturing apparatus 1 includes an injection mechanism portion 20 injecting the molten resin into the iron core body 11, a jig 30 supporting the iron core body 11 in a resin injection step performed by the injection mechanism portion 20 and before and after the resin injection step, and a plate-shaped auxiliary plate 40 attached to the iron core body 11.

Figure 7A:
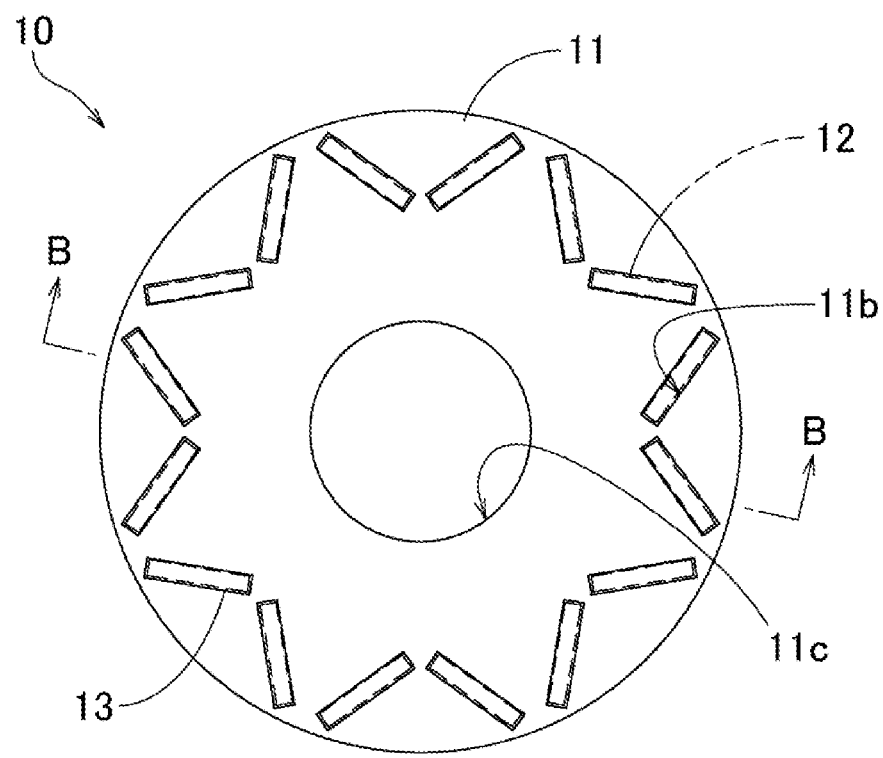
FIG. 7A is a plan view of the iron core body after a resin is filled by the core part manufacturing apparatus according to the first embodiment of the present disclosure.
Figure 7B:
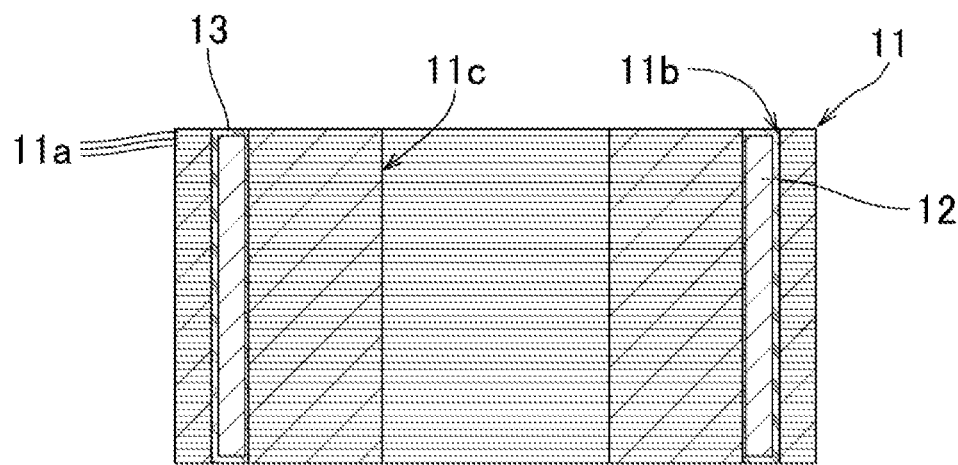
FIG. 7B is a cross-sectional view taken along a line B-B of FIG. 7A.

The core part 10 manufactured by the core part manufacturing apparatus 1 according to the present embodiment includes an iron core body 11 formed by laminating a plurality of thin plates 11a made of a magnetic metal material, permanent magnets 12 inserted and arranged in respective magnet insertion holes 11b as a plurality of space portions provided in the iron core body 11, and a filler 13 made of a resin injected and filled in each magnet insertion hole 11b (see FIGS. 7A and 7B). The core part 10 has a known structure as a rotor of a rotary electric machine (an electric motor or a generator), and a detailed description thereof will be omitted.

The iron core body 11 is a laminated iron core formed by laminating the plurality of thin plates 11a made of a magnetic metal material. The thin plate 11a forming the iron core body 11 is formed by punching a thin plate material made of electromagnetic steel, an amorphous alloy, or the like.

The iron core body 11 is provided with the plurality of magnet insertion holes 11b as space portions into which the permanent magnets 12 can be inserted. The magnet insertion holes 11b are holes penetrating the iron core body 11 in a laminating direction of the thin plates 11a, and are provided in a predetermined arrangement along a circular outer periphery of the iron core body 11. The position, the shape, and the number of the magnet insertion holes 11b can be appropriately set according to a use of the rotary electric machine, a required performance, and the like.

In addition, a shaft hole 11c penetrating the iron core body 11 in the laminating direction of the thin plates 11a is provided in a center of the iron core body 11, and a rotation shaft (shaft) of the rotor can be inserted and fixed in the shaft hole 11c.

The permanent magnet 12 is inserted into each magnet insertion hole 11b of the iron core body 11 as a field of the rotor. Since the permanent magnet 12 is formed to be slightly smaller than the magnet insertion hole 11b of the iron core body 11, when the permanent magnet 12 is inserted into each magnet insertion hole 11b, a gap is generated between the permanent magnet 12 and the iron core body 11. That is, a part of each magnet insertion hole 11b into which the permanent magnet 12 is inserted remains as a space. The remaining portion of the magnet insertion hole 11b except for the permanent magnet 12 is substantially filled with the filler 13.

The filler 13 is obtained by filling the magnet insertion hole 11b, more specifically, the remaining portion of the magnet insertion hole 11b after the insertion of the permanent magnet 12 with a resin injected and filled in a molten state, and solidifying the resin after the resin is filled. The resin constituting the filler 13 is, for example, a thermosetting resin such as an epoxy resin, a thermoplastic resin, or the like, and is obtained by melting and then solidifying resin materials 80 supplied as a resin tablet, a powdery resin, or the like.

The filler 13 fixes the permanent magnet 12 in the magnet insertion hole 11b, and contributes to strengthening a connection between the laminated thin plates 11a adjacent to each other.

The injection mechanism portion 20 injects and fills the molten resin into the space portion to be filled with the resin in the iron core body 11.

The injection mechanism portion 20 includes an upper mold 21 and a lower mold 22 that sandwich the iron core body 11 from both sides thereof in the laminating direction, and extrusion portions 23 each of which extrudes the resin that was heated and melted to a magnet insertion hole 11b side of the iron core body 11.

The injection mechanism portion 20 sandwiches and presses the iron core body 11 placed on the jig 30 between the upper mold 21 and the lower mold 22 from both sides thereof in the laminating direction. Accordingly, a predetermined load is applied to the iron core body 11 from a height direction, and the magnet insertion holes 11b in the iron core body 11 can be closed by the plate portion 31 of the jig 30.

The injection mechanism portion 20 can inject the resin into the magnet insertion hole 11b of the iron core body 11 from a side of the upper mold 21, that is, from a side of an end surface of the iron core body 11 opposite to an end surface thereof abutting on the jig 30.

The upper mold 21 is located above the iron core body 11 placed on the lower mold 22, and holds the iron core body 11, the auxiliary plate 40, and the jig 30 together with the lower mold 22. The upper mold 21 is, for example, a mold formed in a rectangular plate shape, and is configured to be provided with a plurality of accommodating holes 21a. The plurality of accommodating holes 21a are arranged at predetermined intervals so as to be located at positions corresponding to the respective magnet insertion holes 11b of the iron core body 11 in a state where the iron core body 11 is sandwiched between the upper mold 21 and the lower mold 22.

The upper mold 21 also has a mechanism for obtaining molten resins 81 by heating and melting the supplied resin materials 80. The upper mold 21 can accommodate a predetermined number of resin materials 80 in the plurality of accommodating holes 21a arranged to correspond to the plurality of magnet insertion holes 11b of the iron core body 11.

The upper mold 21 is provided with a heater (not illustrated) capable of heating the resin materials 80 accommodated in the respective accommodating holes 21a. When the resin materials 80 are heated in the upper mold 21, the resin materials 80 are melted to become the molten resins 81.

The lower mold 22 sandwiches the iron core body 11 and the jig 30 together with the upper mold 21 while supporting the iron core body 11 and the jig 30 placed thereon. The lower mold 22 is, for example, a mold formed in a rectangular plate shape, and is provided with a concave portion or a convex portion that is fitted to a convex portion or a concave portion provided on a lower surface of the jig 30 to prevent unnecessary movement of the jig as necessary.

The extrusion portions 23 can extrude the molten resins 81 into the magnet insertion holes 11b of the iron core body 11, and are configured to be, for example, a plurality of plungers that can be moved up and down by being driven by a predetermined drive source.

Figure 5:
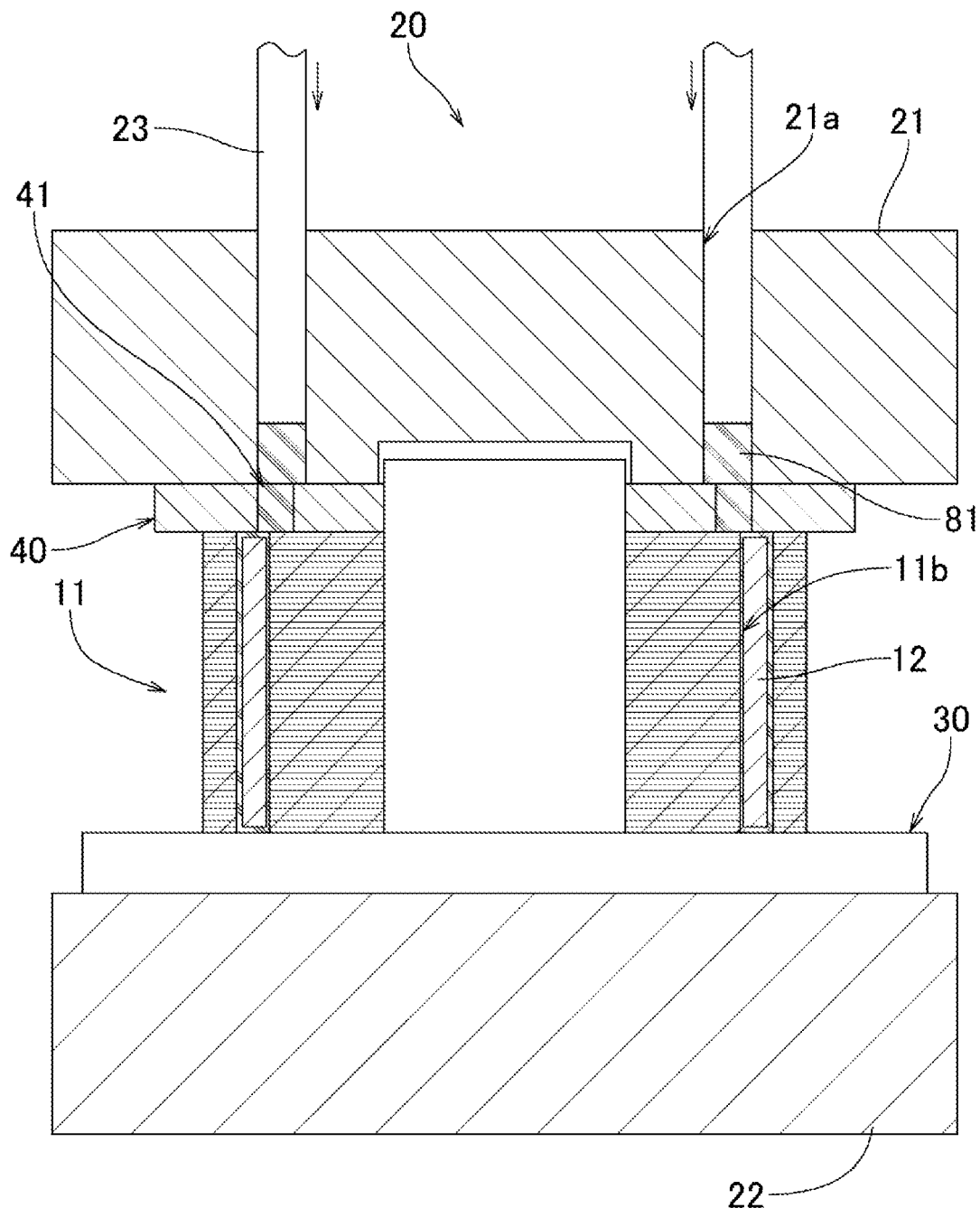
FIG. 5 is an illustrative view of a molten resin injection state in the core part manufacturing apparatus according to the first embodiment of the present disclosure.

The extrusion portions 23 are arranged so as to be insertable into the accommodating holes 21a of the upper mold 21 from above, respectively (see FIGS. 1 and 5). The extrusion portions 23 may be driven by respective drive sources corresponding to the extrusion portions so as to be movable up and down, or the plurality of extrusion portions may be collectively driven by a single drive source so as to be integrally movable up and down.

Figure 3:
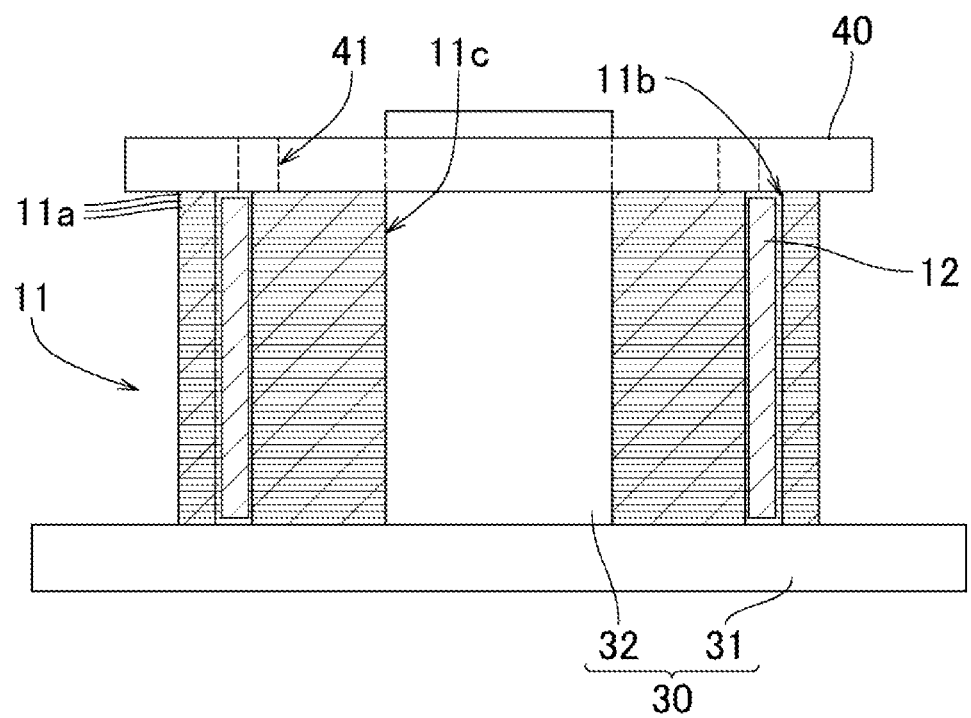
FIG. 3 is a longitudinal cross-sectional view of the iron core body in a state of being supported by a jig in the core part manufacturing apparatus according to the first embodiment of the present disclosure.
Figure 4:
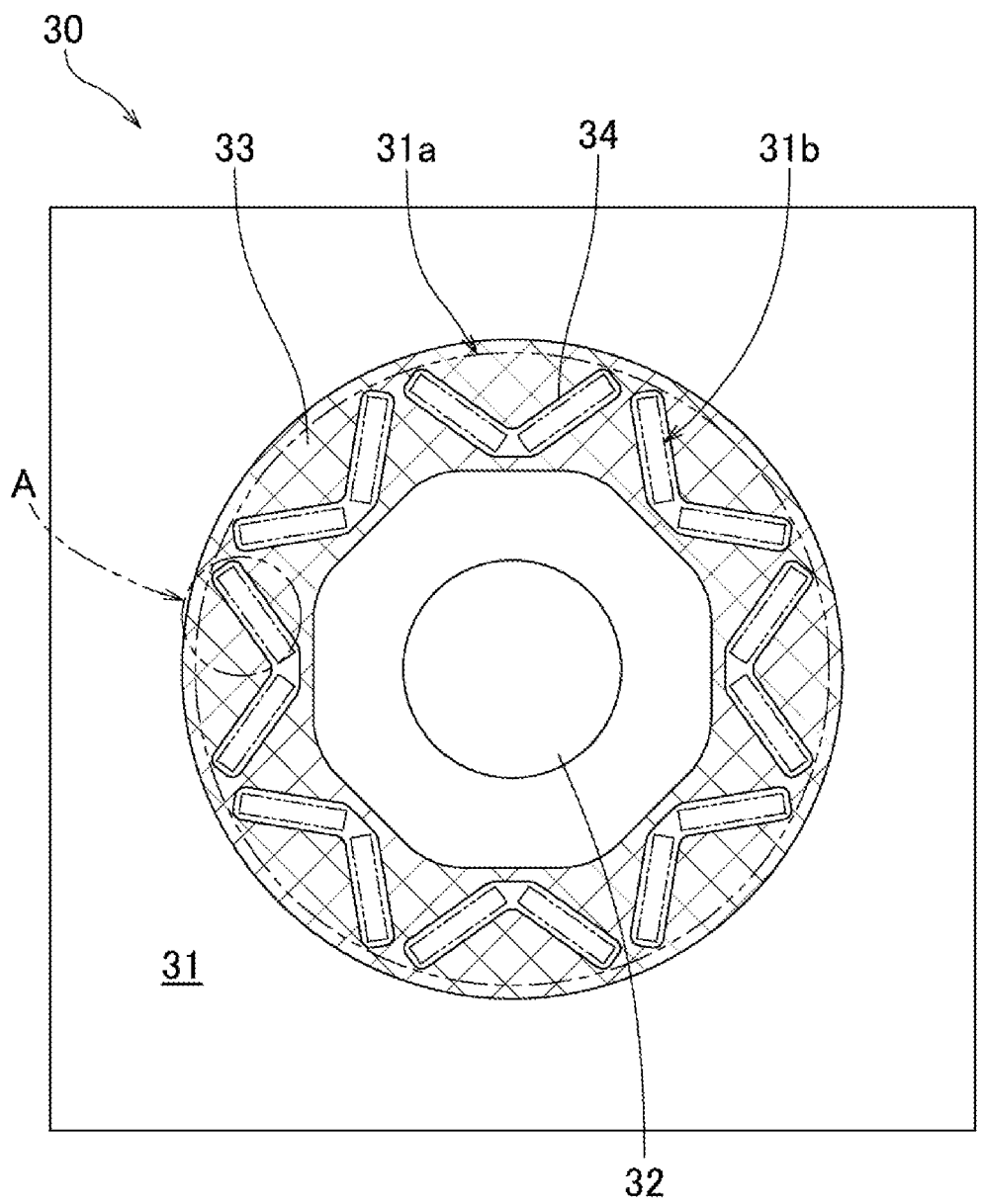
FIG. 4 is a plan view of the jig in the core part manufacturing apparatus according to the first embodiment of the present disclosure.

The jig 30 includes a plate portion 31 on which the iron core body 11 can be placed, and a post portion 32 protruding upward from a substantially central portion of the plate portion 31 (see FIGS. 3 and 4).

The plate portion 31 is, for example, a rectangular plate-shaped trapezoidal member, and supports the iron core body 11 in a state where the iron core body 11 is placed on the plate portion 31 and abuts on any end surface of the iron core body 11 in the thin-plate laminating direction.

Since the iron core body 11 is placed on the plate portion 31 and supported by the plate portion 31 from below, the plate portion 31 is in contact with a lower end surface of the iron core body 11 at a predetermined contact surface 31a, the lower end surface being opposite to an upper mold 21 side where the resin is injected into the magnet insertion hole 11b of the iron core body 11.

The plate portion 31 is provided with relief portions 33 that are recessed and are not in contact with the end surface of the iron core body 11 around non-contact regions 31b that face the magnet insertion holes 11b of the iron core body 11 in the contact surface 31a. The relief portion 33 is provided around each of the non-contact regions 31b on the contact surface 31a in a way of being parallel to a contour of the non-contact regions 31b by removing the plate portion 31, for example, by cutting, grinding, polishing, electric discharge machining, etching, or the like. Further, the relief portion 33 corresponds to warpage, bending, or the like of the thin plates 11a forming the iron core body 11, which appears as a non-flat portion on the end surface of the iron core body 11, and is provided to have a degree of recess to such an extent that the relief portion 33 does not come into contact with the end surface including the non-flat portion of the iron core body 11.

Figure 6A:
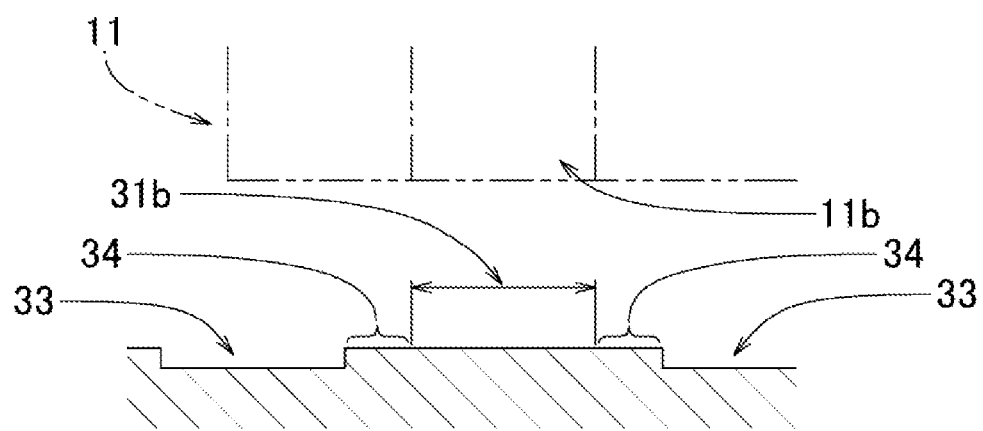
FIG. 6A is an enlarged cross-sectional view of illustrating an arrangement state of a relief portion and a remaining portion in a portion A of FIG. 4.
Figure 6B:
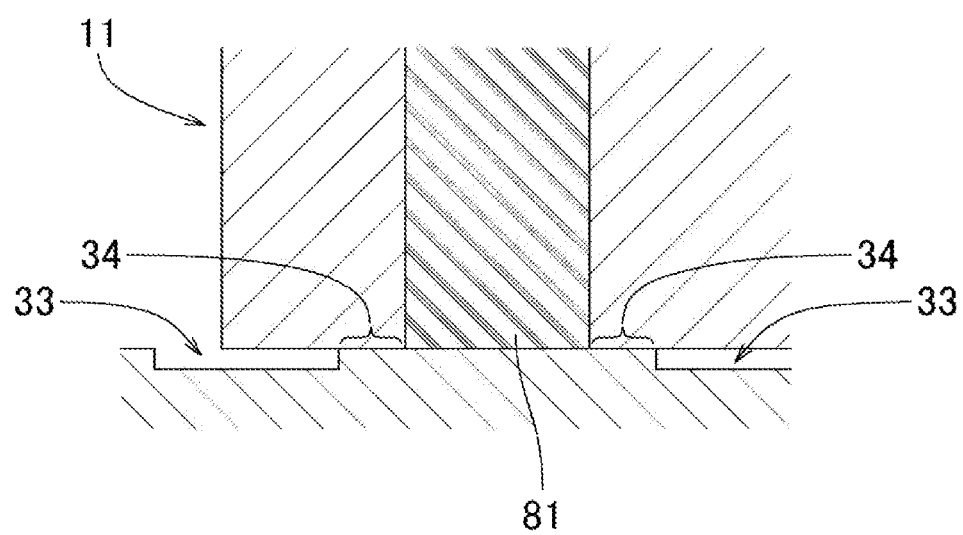
FIG. 6B is an illustrative view of illustrating an abutting state between a main portion of a jig plate portion and an iron core body end surface at the time of injection of the molten resin in the core part manufacturing apparatus according to the first embodiment of the present disclosure.

Then, on the contact surface 31a of the plate portion 31, a remaining portion 34 that is adjacent to the non-contact regions 31b and does not become the relief portion 33 remains in a shape surrounding every two non-contact regions 31b (see FIGS. 4 and 6A).

On the contact surface 31a of the plate portion 31, the remaining portion 34 remains in a shape surrounding every two non-contact regions 31b, but the present disclosure is not limited thereto, and the remaining portion 34 may remain in a shape surrounding each non-contact region 31b or two or more non-contact regions 31b.

The post portion 32 is formed in a cylindrical shape and disposed at a substantially central portion of an upper surface of the plate portion 31 so as to protrude upward. The post portion 32 has a columnar shape having a size corresponding to the shaft hole 11c of the iron core body 11, and can be inserted into the shaft hole 11c of the iron core body 11.

The auxiliary plate 40 is a plate-shaped member in which a resin flow path 41 (for example, a runner or a gate hole) for guiding the resin to each magnet insertion hole 11b is formed, is attached, as a so-called cull plate, to an end surface of the iron core body 11 on a side not in contact with the jig 30, and is positioned between the upper mold 21 and the iron core body 11 in a state where the iron core body 11 is sandwiched between the upper mold 21 and the lower mold 22 of the injection mechanism portion 20.

By attaching the auxiliary plate 40 to the iron core body 11, after the molten resin 81 injected and filled into the iron core body 11 is solidified, it is possible to remove cull of the solidified resin remaining on an upper portion of the iron core body 11 by removing the auxiliary plate 40, and it is possible to more easily remove an unnecessary resin.

Next, a core part manufacturing process by the core part manufacturing apparatus 1 according to the present embodiment will be described.

As a premise, it is assumed that the iron core body 11 in which the plurality of thin plates 11a punched from the thin plate material are laminated is obtained in advance by a known manufacturing method. Then, it is assumed that the iron core body 11 is transferred toward the injection mechanism portion 20 by a predetermined transfer mechanism together with the jig 30 on which the iron core body 11 is placed in a state where the permanent magnet 12 is inserted into the magnet insertion hole 11b and preheated to an appropriate temperature.

Further, the auxiliary plate 40 is attached to the iron core body 11 before the preheating and is preheated together with the iron core body 11, or the separately preheated auxiliary plate 40 is attached to the iron core body 11 after the preheating, so that the iron core body 11 is transferred toward the injection mechanism portion 20 together with the attached auxiliary plate 40.

Further, it is assumed that on the upper mold 21 of the injection mechanism portion 20, one or a plurality of resin materials 80 as a material of the molten resin 81 are automatically supplied to the accommodating holes 21a in the upper mold 21, and the upper mold 21 heats and melts the resin materials 80 before injection.

The iron core body 11 to which the auxiliary plate 40 is attached and the jig 30 on which the iron core body 11 and the auxiliary plate 40 are placed are transferred toward the injection mechanism portion 20 by an operation of the transfer mechanism and reach the injection mechanism portion 20, the iron core body 11, the auxiliary plate 40, and the jig 30 are carried in between the upper mold and the lower mold of the injection mechanism portion 20 through an opening portion for carrying in and out the iron core body of the injection mechanism portion 20.

When the jig 30 on which the iron core body 11 is placed is placed on the lower mold 22 by the transfer mechanism, the iron core body 11, the auxiliary plate 40, and the jig 30 are completely carried into the injection mechanism portion 20.

On the other hand, one or a plurality of resin materials 80 as a material of the molten resin 81 are supplied to the upper mold 21 of the injection mechanism portion 20, and the resin materials 80 accommodated in the respective accommodating holes 21a are heated at an appropriate timing. In each of the accommodating holes 21a, the resin material 80 is melted by heating and becomes the molten resin 81.

After the iron core body 11, the auxiliary plate 40, and the jig 30 are carried into a space between the upper mold 21 and the lower mold 22 and the iron core body 11 can be sandwiched between the upper mold 21 and the lower mold 22, the upper mold 21 is lowered or the lower mold 22 on which the iron core body 11 is placed is raised to shift the state to a state in which the iron core body 11 is sandwiched and pressed between the upper mold 21 and the lower mold 22 via the auxiliary plate 40 and the jig 30 (see FIG. 1).

In this state, the auxiliary plate 40 and the jig 30 respectively abut on and are pressed against both axial end surfaces of the iron core body 11, so that the magnet insertion holes 11b can be closed at the end portions in the axial direction of the iron core body 11.

After the magnet insertion holes 11b of the iron core body 11 are isolated from the outside by the closing by the injection mechanism portion 20, the injection step of the molten resin 81 is executed.

Here, with respect to the molten resin 81 in each of the accommodating holes 21a of the upper mold 21, each of the extrusion portions 23 reaches the accommodating hole 21a of the upper mold 21 and is inserted into the accommodating hole 21a, and thus the molten resin 81 is extruded from the accommodating hole 21a to the magnet insertion hole 11b of the lower iron core body 11 through the resin flow path 41 of the auxiliary plate 40 by the extrusion portion 23 (see FIG. 5). In this way, the molten resin 81 is injected and filled into the magnet insertion hole 11b.

The molten resin 81 is injected into each magnet insertion hole 11b under pressure, and the pressure of the molten resin 81 is applied to the non-contact region 31b facing the magnet insertion hole 11b on the lower end surface of the iron core body 11 on the side opposite to the side where the resin is injected, and the molten resin 81 tends to further advance from the magnet insertion hole 11b to a space between the end surface of the iron core body 11 around the magnet insertion hole 11b and a peripheral portion of the non-contact region 31b of the plate portion 31. On the other hand, by providing the relief portion 33 on the contact surface 31a of the plate portion 31 to reduce the contact area with the end surface of the iron core body 11 and to increase a contact surface pressure of the remaining portion 34 of the plate portion 31 in contact with the portion around the magnet insertion hole 11b on the end surface of the iron core body 11, it is possible to suppress leakage of the molten resin 81 from between the remaining portion 34 and the end surface of the iron core body 11. Further, at a boundary between the remaining portion 34 and the relief portion 33, a corner portion of the remaining portion 34 abuts on the iron core body 11, and a large pressure is locally applied thereto. Accordingly, it is possible to reliably prevent the molten resin 81 from leaking from the remaining portion 34 to the relief portion 33 (see FIG. 6B).

Further, since the molten resin 81 is particularly likely to leak from a portion where a width between an outer edge of the contact surface 31a (an outer edge of the iron core body 11) and the non-contact region 31b (the magnet accommodating hole 11b) is narrow, the contact surface pressure of the remaining portion 34 of the plate portion 31 can be increased by providing the relief portion 33 in the portion where the width is narrow, and the resin leakage can be more effectively prevented.

When the molten resin 81 filled in each magnet insertion hole 11b is solidified, the extrusion portions 23 are pulled up to return to an original state, the upper mold 21 is raised or the lower mold 22 is lowered to separate the upper mold 21 from the auxiliary plate 40, and the sandwiching and pressing of the iron core body 11 by the upper mold 21 and the lower mold 22 are ended to bring the iron core body 11, the auxiliary plate 40, and the jig 30 into a state of being able to be carried out from between the upper mold and lower mold. In the iron core body 11 in which the molten resin 81 is solidified, since the leakage of the resin reaching an outer peripheral side thereof is prevented, the cured burr of the leaked resin does not protrude from the outer periphery of the iron core body 11, and the removal of the burr is unnecessary.

Thereafter, the iron core body 11, the auxiliary plate 40, and the jig 30 are carried out of the injection mechanism portion 20 from between the upper mold 21 and the lower mold 22 by the transfer mechanism. The iron core body 11, the auxiliary plate 40, and the jig 30 carried out from the injection mechanism portion 20 are transferred to the next step by the operation of the transfer mechanism.

As described above, in the core part manufacturing apparatus according to the present embodiment, on the contact surface 31a of the plate portion 31 of the jig 30 that is in contact with the end surface of the iron core body 11 on a side opposite to a resin injection side by the injection mechanism portion 20, the relief portion 33 is provided around the non-contact region 31b facing the magnet insertion hole 11b of the iron core body 11 in the contact surface 31a, and only the remaining portion 34 adjacent to the non-contact region 31b of the plate portion 31 abuts on the iron core body end surface when the resin is injected. Accordingly, the contact surface pressure in the remaining portion 34 along the non-contact region 31b becomes relatively high as the contact area between the iron core body 11 and the contact surface 31a is reduced by the relief portion 33, the remaining portion 34 of the contact surface 31a intensively presses a periphery of the magnet insertion hole 11b of the iron core body 11 to block the resin, the leakage of the resin from the magnet insertion hole 11b to a space between the iron core body end surface and the plate portion 31 can be prevented, the leakage of the resin reaching the outer peripheral side of the iron core body 11 can be prevented, the cured burr of the leaked resin can be prevented from protruding from the outer periphery of the iron core body 11, a burr removal step, a burr image inspection step, or the like are unnecessary, and a manufacturing cost of the core part can be suppressed.

In the core part manufacturing apparatus 1 according to the present embodiment, the injection mechanism portion 20 is configured such that the auxiliary plate 40 provided with the through hole or the concave portion that is the resin flow path 41 communicating with the magnet insertion hole 11b of the iron core body 11 is attached to an upper side of the iron core body 11, and the molten resin 81 extruded from the upper mold 21 is injected into the magnet insertion hole 11b of the iron core body 11 through the auxiliary plate 40, but the present disclosure is not limited thereto. A configuration can also be adopted in which the auxiliary plate is not attached to the iron core body 11, and the molten resin 81 is extruded from the upper mold 21 and injected into the magnet insertion hole 11b of the iron core body 11 in a state in which the upper mold 21 accommodating the molten resin 81 directly abuts on the iron core body 11 by the injection mechanism portion 20.

2. Second Embodiment

In the core part manufacturing apparatus 1 according to the first embodiment, resin injection is performed from an upper mold 21 side of the injection mechanism portion 20 to the iron core body 11, but the present disclosure is not limited thereto. As the second embodiment, as illustrated in FIGS. 8 to 10, and FIGS. 11A and 11B, the resin may also be injected from a lower mold 27 side of the injection mechanism portion 25.

In this case, the core part manufacturing apparatus 1 according to the present embodiment includes an injection mechanism portion 25, a jig 37, and an auxiliary plate 45 as in the first embodiment, and is different from the first embodiment in that the injection mechanism portion 25 is a mechanism that heats and melts the resin material 80 by the lower mold 27 and injects the molten resin into the iron core body 11 from the lower mold 27 side, and the jig 37 and the auxiliary plate 45 are configured in a shape corresponding to the resin injection from the lower mold 27 side.

The injection mechanism portion 25 includes an upper mold 26, the lower mold 27, and an extrusion portion 29 as in the first embodiment, and is different from the first embodiment in that the lower mold 27 accommodates the resin material 80 and is configured to be capable of heating the resin material 80.

Then, the injection mechanism portion 25 can inject the resin into the magnet insertion hole 11b of the iron core body 11 through the jig 37 from the lower mold 27 side, that is, from a side of the end surface of the iron core body 11 that abuts on the jig 37.

Similarly to the first embodiment, the upper mold 26 sandwiches the iron core body 11, the auxiliary plate 45, and the jig 37 between the upper mold 26 and the lower mold 27, and applies a predetermined load to the iron core body 11 from the laminating direction. The upper mold 26 has the same configuration as that of the first embodiment except that the hole or the like (the accommodating hole 21a and the extrusion portion 23) penetrating the upper mold 26 is not provided, and a detailed description thereof will be omitted.

The lower mold 27 supports the iron core body 11, the auxiliary plate 45, and the jig 37 as in the first embodiment, and is different from the first embodiment in that the lower mold 27 is provided with a plurality of accommodating holes 27a arranged to correspond to the plurality of magnet insertion holes 11b of the iron core body 11.

Each of the accommodating holes 27a of the lower mold 27 is a hole continuous in the height direction of the lower mold 27, and is capable of accommodating at least one resin material 80.

The lower mold 27 is provided with a heater (not illustrated) capable of heating the resin material 80 accommodated in each accommodating hole 27a. When the resin material 80 is heated in the lower mold 27, the resin material 80 is melted to become the molten resin 81.

The extrusion portions 29 can extrude the molten resin 81 into the magnet insertion holes 11b of the iron core body 11, and are configured to be, for example, a plurality of plungers that can be moved up and down by being driven by a predetermined drive source.

The extrusion portions 29 are disposed so as to be insertable into the accommodating holes 27a of the lower mold 27 from below, respectively. The extrusion portions 29 may be driven by respective drive sources corresponding to the extrusion portions so as to be movable up and down, or the plurality of extrusion portions may be collectively driven by a single drive source so as to be integrally movable up and down.

The jig 37 includes a plate portion 38 and a post portion 39 as in the first embodiment, and is different from the first embodiment in that the plate portion 38 is provided with a plurality of resin flow paths 38a that are holes penetrating the plate portion 38. The plurality of resin flow paths 38a of the plate portion 38 are holes that are continuous in a height direction of the plate portion 38, and are disposed so as to correspond to the plurality of magnet insertion holes 11b of the iron core body 11 and the accommodating holes 27a of the lower mold 27.

Similarly to the first embodiment, the plate portion 38 of the jig 37 supports the iron core body 11 in a state where the iron core body 11 is placed on the plate portion 38 and abuts on an end surface of the iron core body 11 in the thin-plate laminating direction.

Similarly to the first embodiment, the auxiliary plate 45 is a plate-shaped member and is attached to an end surface of the iron core body 11 on a side not in contact with the jig 37, and is different from the first embodiment in that the auxiliary plate 45 is not provided with the resin flow path for guiding the resin to each magnet insertion hole 11b.

The auxiliary plate 45 is in contact with an upper end surface of the iron core body 11 at a predetermined contact surface 45a, the upper end surface being opposite to the lower mold 27 side where the resin is injected into the magnet insertion hole 11b of the iron core body 11.

The auxiliary plate 45 is provided with relief portions 46 that are recessed and are not in contact with the end surface of the iron core body 11 around non-contact regions 45b that face the magnet insertion holes 11b of the iron core body 11 in the contact surface 45a.

On the contact surface 45a of the auxiliary plate 45, the remaining portion 47 that is adjacent to the non-contact regions 45*b* and does not become the relief portion 46 remains in a shape surrounding every two non-contact regions 45*b*.

Similarly to the first embodiment, the auxiliary plate 45 is located between the upper mold 26 and the iron core body 11 in a state where the iron core body 11 is sandwiched between the upper mold 26 and the lower mold 27 of the injection mechanism portion 20.

In the contact surface 45*a* of the auxiliary plate 45, the remaining portion 47 remains in a shape surrounding every two non-contact regions 45*b*, but the present disclosure is not limited thereto, and the remaining portion 47 may remain in a shape surrounding each non-contact region 45*b* or two or more non-contact regions 45*b*.

Next, a core part manufacturing process by the core part manufacturing apparatus 1 according to the present embodiment will be described.

As a premise, similarly to the first embodiment, it is assumed that the iron core body 11 in which the plurality of thin plates 11*a* are laminated in advance is obtained, and the iron core body 11 is transferred toward the injection mechanism portion 25 by the transfer mechanism together with the jig 37 on which the iron core body 11 is mounted in a state in which the permanent magnet 12 is inserted into the magnet insertion hole 11*b* and preheated to an appropriate temperature.

Further, the auxiliary plate 45 is attached to a side of the upper mold 26 of the injection mechanism portion 25 facing the iron core body 11.

Further, it is assumed that on the lower mold 27 of the injection mechanism portion 25, one or a plurality of resin materials 80 as a material of the molten resin 81 are automatically supplied to the accommodating holes 27*a* in the lower mold 27, and the resin materials 80 are heated and melted by the lower mold 27 before injection.

One or a plurality of resin materials 80 are supplied to the lower mold 27 of the injection mechanism portion 25 between the loading and unloading of the iron core body 11 into and from the injection mechanism portion 25, and are accommodated in the accommodating holes 27*a* of the lower mold 27. The resin material 80 accommodated in each accommodating hole 27*a* is heated at an appropriate timing, and the resin material 80 is melted by the heating in each accommodating hole 27*a* to become the molten resin 81.

On the other hand, the iron core body 11 and the jig 37 on which the iron core body 11 is placed are transferred toward the injection mechanism portion 25 by an operation of the transfer mechanism, and when the iron core body 11 and the jig 37 reach the injection mechanism portion 25, the iron core body 11 and the jig 37 are carried between the upper and lower molds of the injection mechanism portion 25 through the opening portion for carrying in and out the iron core body of the injection mechanism portion 25.

When the jig 37 on which the iron core body 11 is placed is placed on the lower mold 27 by the transfer mechanism, the iron core body 11 and the jig 37 are completely carried into the injection mechanism portion 25.

Figure 8:
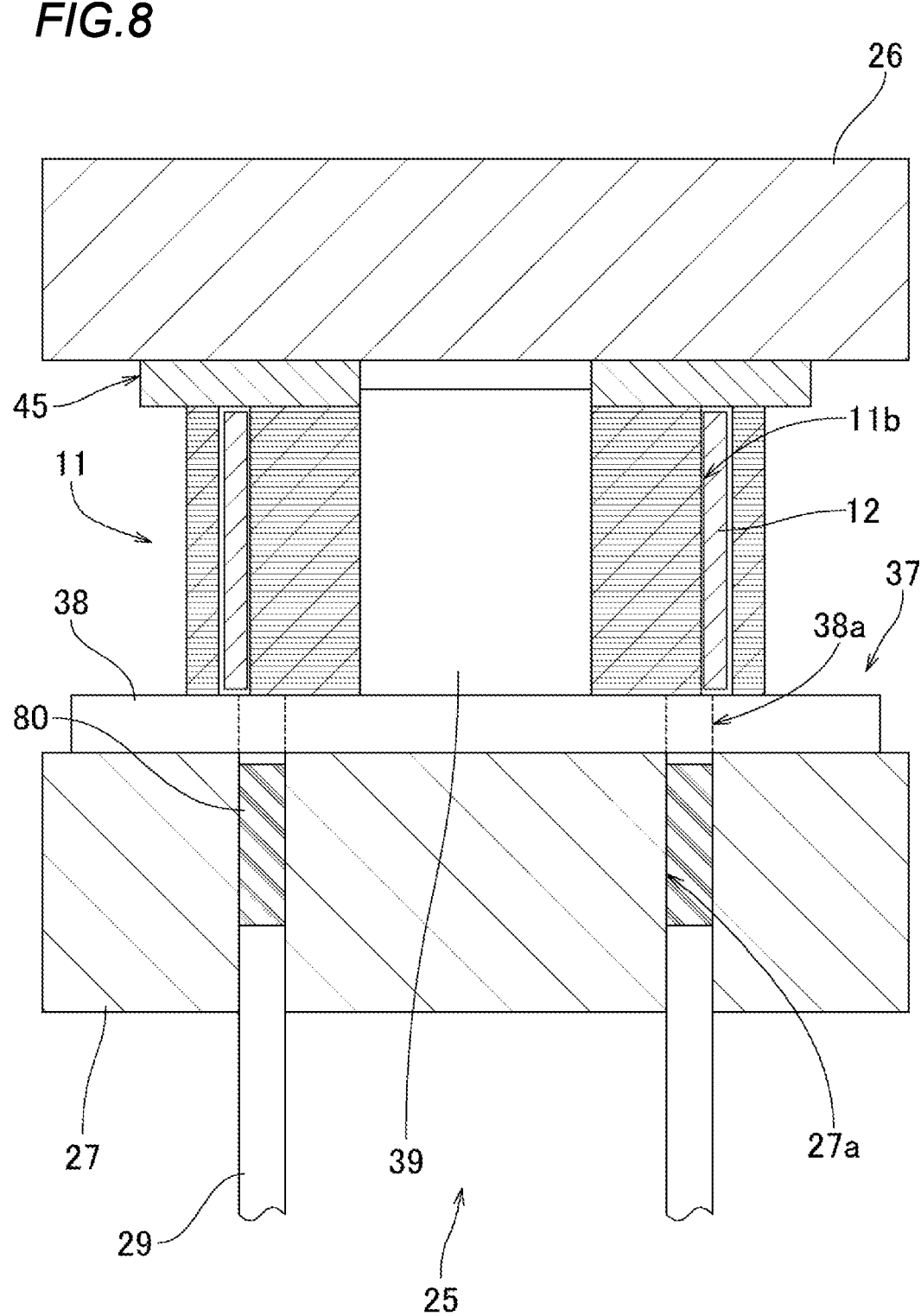
FIG. 8 is a schematic configuration diagram of a core part manufacturing apparatus according to a second embodiment of the present disclosure.

After the iron core body 11 and the jig 37 are placed on the lower mold 27, the upper mold 26 is lowered or the lower mold 27 on which the iron core body 11 is placed is raised to shift the state to a state where the iron core body 11 is sandwiched and pressed by the upper mold 26 and the lower mold 27 (see FIG. 8).

In this state, the auxiliary plate 45 and the jig 37 respectively abut on and are pressed against both axial end surfaces of the iron core body 11, so that the magnet insertion holes 11*b* can be closed at the end portions in the laminating direction of the iron core body 11.

After the magnet insertion holes 11*b* of the iron core body 11 are isolated from the outside by the closing by the injection mechanism portion 25, the injection step of the molten resin 81 is executed.

Figure 10:
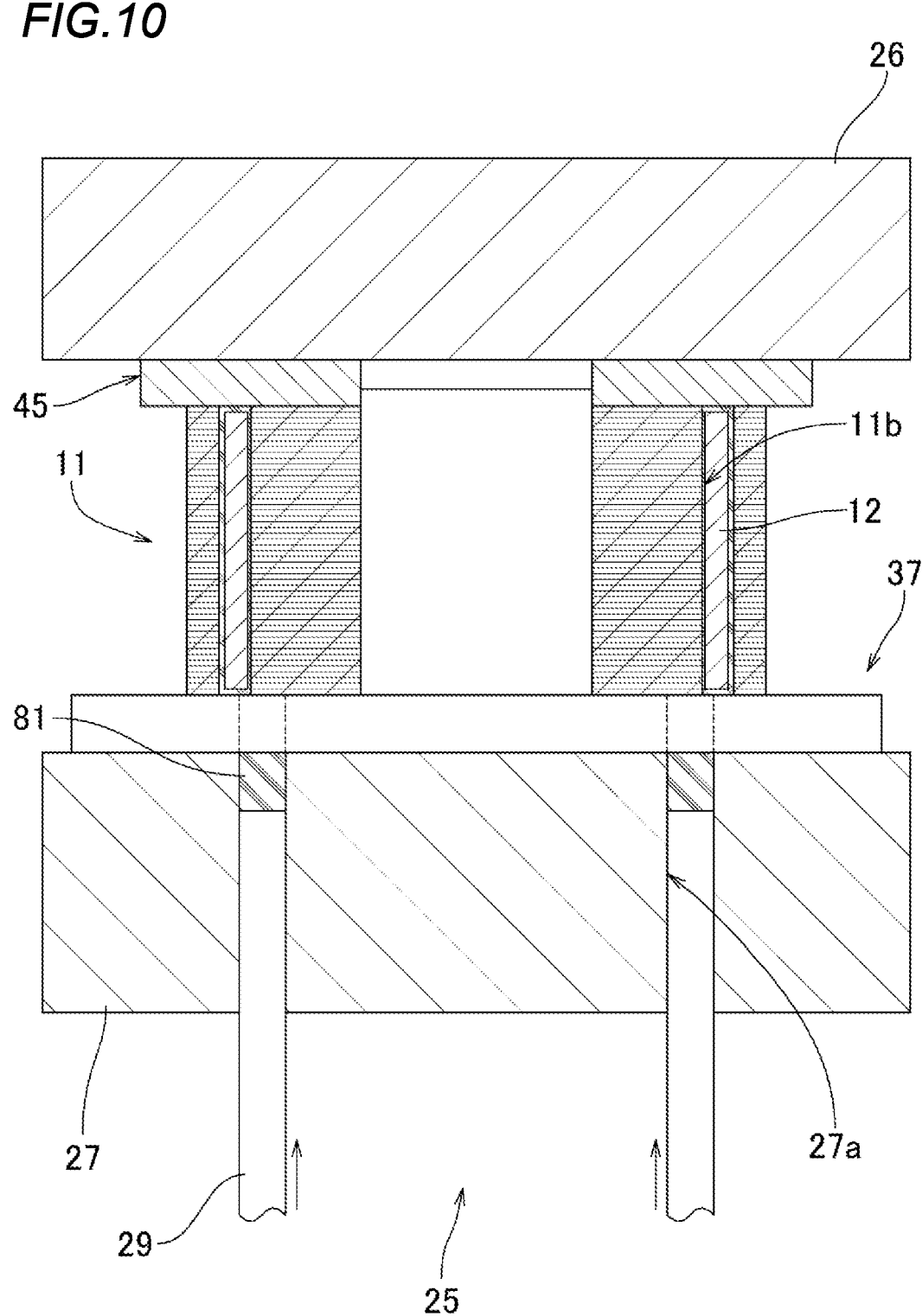
FIG. 10 is an illustrative view of a molten resin injection state in the core part manufacturing apparatus according to the second embodiment of the present disclosure.
Figure 11A:
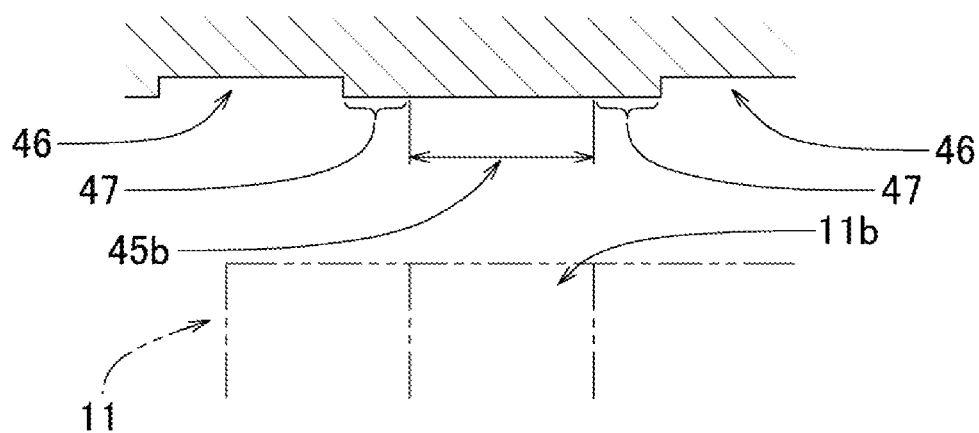
FIG. 11A is an enlarged cross-sectional view of illustrating an arrangement state of a relief portion and a remaining portion in a portion C of FIG. 9.
Figure 11B:
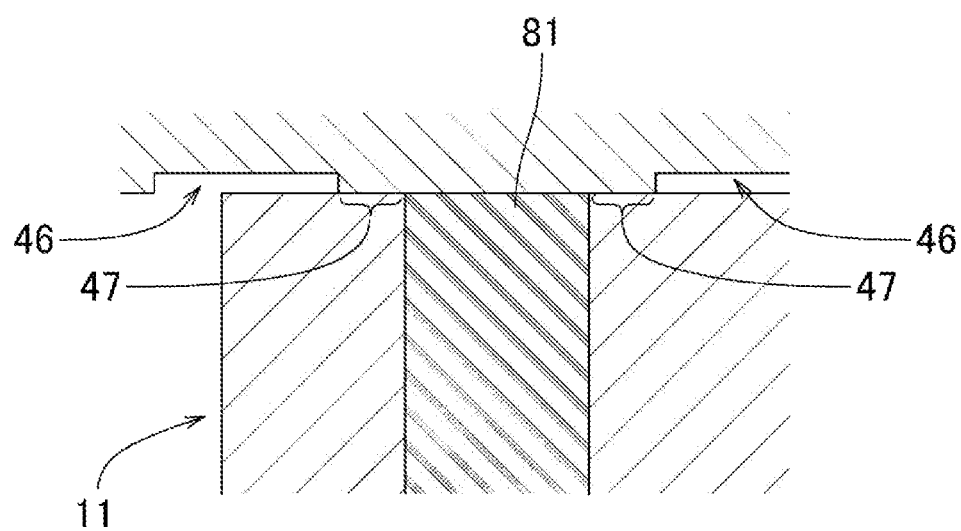
FIG. 11B is an illustrative view of illustrating an abutting state between a main portion of an auxiliary plate portion and an iron core body end surface at the time of injection of the molten resin in the core part manufacturing apparatus according to the second embodiment of the present disclosure.

Here, with respect to the molten resin 81 in each of the accommodating holes 27*a* of the lower mold 27, each of the extrusion portions 29 reaches each of the accommodating holes 27*a* of the lower mold 27 from below and is inserted into each of the accommodating holes 27*a*, and thus the molten resin 81 is extruded from the accommodating hole 27*a* to the magnet insertion hole 11*b* of the upper iron core body 11 through the resin flow path 38*a* of the plate portion 38 in the jig 37 by the extrusion portion 29 (see FIG. 10). In this way, the molten resin 81 is injected and filled into the magnet insertion hole 11*b*.

The molten resin 81 is injected into each magnet insertion hole 11*b* under pressure, and the pressure of the molten resin 81 is applied to the non-contact region 45*b* of the auxiliary plate 45 facing the magnet insertion hole 11*b* on an upper end surface of the iron core body 11 that is in contact with the auxiliary plate 45 on the side opposite to the side where the resin is injected, and the molten resin 81 tends to further advance from the magnet insertion hole 11*b* to a space between the end surface of the iron core body 11 around the magnet insertion hole 11*b* and a peripheral portion of the non-contact region 45*b* of the auxiliary plate 45. On the other hand, by providing the relief portion 46 on the contact surface 45*a* of the auxiliary plate 45 to reduce a contact area with the end surface of the iron core body 11 and to increase a contact surface pressure of the remaining portion 47 of the auxiliary plate 45 in contact with the portion around the magnet insertion hole 11*b* on the end surface of the iron core body 11, it is possible to suppress leakage of the molten resin 81 from between the remaining portion 47 and the end surface of the iron core body 11. Further, at a boundary between the remaining portion 47 and the relief portion 46, a corner portion of the remaining portion 47 abuts on the iron core body 11, and a large pressure is locally applied. Accordingly, it is possible to reliably prevent the molten resin 81 from leaking from the remaining portion 47 to the relief portion 46 (see FIG. 11B).

Further, since the molten resin 81 is particularly likely to leak from a portion (bridge portion) where a width between an outer edge of the contact surface 45*a* (an outer edge of the iron core body 11) and the non-contact region 45*b* (the magnet accommodating hole 11*b*) is narrow, the contact surface pressure of the remaining portion 47 of the auxiliary plate 45 can be increased by providing the relief portion 46 in the portion (bridge portion) where the width is narrow, and the resin leakage can be more effectively prevented.

When the molten resin 81 filled in each magnet insertion hole 11*b* is solidified, the extrusion portions 29 are lowered to return to an original state, the upper mold 26 is raised or the lower mold 27 is lowered to separate the upper mold 26, the auxiliary plate 45 from the iron core body 11, and the sandwiching and pressing of the iron core body 11 by the upper mold 26 and the lower mold 27 are ended to bring the iron core body 11 and the jig 37 into a state of being able to be carried out from between the upper mold and lower mold. In the iron core body 11 in which the molten resin 81 is solidified, since the leakage of the resin reaching the outer peripheral side thereof is prevented, the cured burr of the leaked resin does not protrude from an outer periphery of the iron core body 11, and the removal of the burr is unnecessary.

Thereafter, as in the first embodiment, the iron core body 11 and the jig 37 are carried out of the injection mechanism portion 25 from between the upper mold 26 and the lower mold 27 by the transfer mechanism, and further transferred to the next step.

As described above, in the core part manufacturing apparatus 1 according to the present embodiment, at the contact surface 45a of the auxiliary plate 45 that is in contact with the upper end surface of the iron core body 11 on a side opposite to a resin injection side by the injection mechanism portion 25, the relief portion 46 is provided around the non-contact region 45b facing the magnet insertion hole 11b of the iron core body 11 in the contact surface 45a, and only the remaining portion 47 adjacent to the non-contact region 45b of the auxiliary plate 45 abuts on the iron core body end surface when the resin is injected. Accordingly, the contact surface pressure in the remaining portion 47 along the non-contact region 45b becomes relatively high as the contact area between the iron core body 11 and the contact surface 45a is reduced by the relief portion 46, the remaining portion 47 of the contact surface 45a intensively presses the periphery of the magnet insertion hole 11b of the iron core body 11 to block the resin, the leakage of the resin from the magnet insertion hole 11b to a space between the iron core body end surface and the auxiliary plate 45 can be suppressed, the leakage of the resin reaching the outer peripheral side of the iron core body 11 can be prevented, the cured burr of the leaked resin can be prevented from protruding from the outer periphery of the iron core body 11, a burr removal step, a burr image inspection step, or the like are unnecessary, and a manufacturing cost of the core part can be suppressed.

In the core part manufacturing apparatus 1 according to the embodiment, in the injection mechanism portion 25, the auxiliary plate 45 is attached to the upper mold 26, the auxiliary plate 45 is disposed on the upper side of the iron core body 11, and the relief portion 46 is provided on the contact surface 45a of the auxiliary plate 45 that is in contact with the iron core body 11, the surface pressure at which the remaining portion 47, which remains without forming the relief portion 46, comes into contact with the iron core body end surface is increased, and the molten resin 81 is blocked by the remaining portion 47 to suppress the leakage of the resin from the magnet insertion hole 11b to between the end surface of the iron core body 11 and the auxiliary plate 45. However, the present disclosure is not limited thereto, and it is also possible to adopt a configuration in which the auxiliary plate is not attached to the upper mold, and the injection step is executed by bringing the upper end surface of the iron core body 11 on the side opposite to the resin injection side into direct contact with the upper mold in the injection mechanism portion 25.

In this case, as in the case of the auxiliary plate 45, on the contact surface of the upper mold in contact with the end surface of the iron core body 11, the relief portion is provided at least in a peripheral portion on a contact surface outer peripheral side of the non-contact region facing the magnet insertion hole 11b of the iron core body 11 on the contact surface, and the remaining portion that does not become the relief portion remains in an edge shape along at least the contact surface outer peripheral side of the non-contact region, so that the surface pressure of the remaining portion of the upper mold in contact with the iron core body end surface is increased, and the remaining portion blocks the molten resin 81 that will advance from the magnet insertion hole 11b to the outer peripheral side of the iron core body 11, and it is possible to suppress the leakage of the resin from the magnet insertion hole 11b to the outer peripheral side of the iron core body 11.

As described above, since the molten resin 81 does not leak to the outer peripheral side of the iron core body 11, in the iron core body 11 in which the molten resin 81 is solidified, similarly to the present embodiment, it is possible to reliably prevent a cured burr of the leaked resin from being in a state of protruding from the outer periphery of the iron core body 11.

3. Other Embodiments

In the core part manufacturing apparatus 1 according to the first embodiment, as illustrated in FIG. 4, the contact surface 31a of the plate portion 31 of the jig 30 in contact with the end surface of the iron core body 11 is configured such that the relief portion 33 is provided on the entire periphery of the non-contact region 31b facing the magnet insertion hole 11b of the iron core body 11 in the contact surface 31a, and the remaining portion 34 that does not become the relief portion 33 remains so as to surround one or a plurality of non-contact regions 31b.

Figure 9:
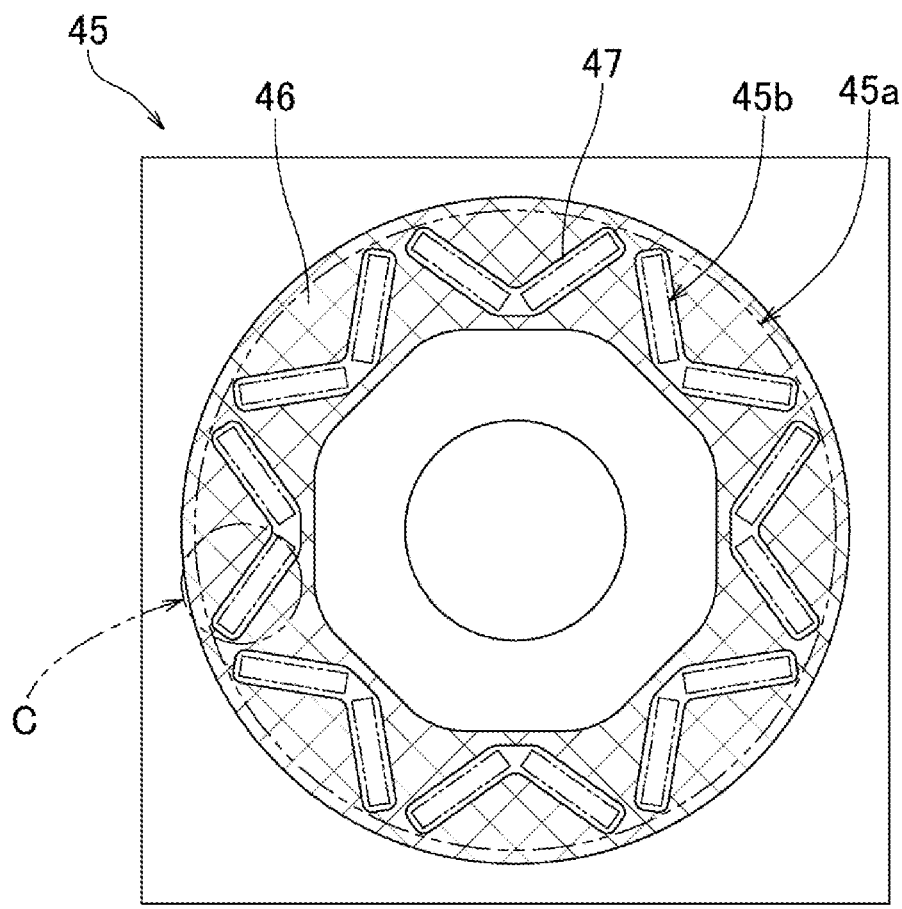
FIG. 9 is a bottom view of an auxiliary plate in the core part manufacturing apparatus according to the second embodiment of the present disclosure.

Further, in the core part manufacturing apparatus 1 according to the second embodiment, as illustrated in FIG. 9, the contact surface 45a of the auxiliary plate 45 in contact with the end surface of the iron core body 11 is configured such that the relief portion 46 is provided on the entire periphery of the non-contact region 45b facing the magnet insertion hole 11b of the iron core body 11 in the contact surface 45a, and the remaining portion 47 that does not become the relief portion 46 remains so as to surround one or a plurality of non-contact regions 45b.

Figure 12:
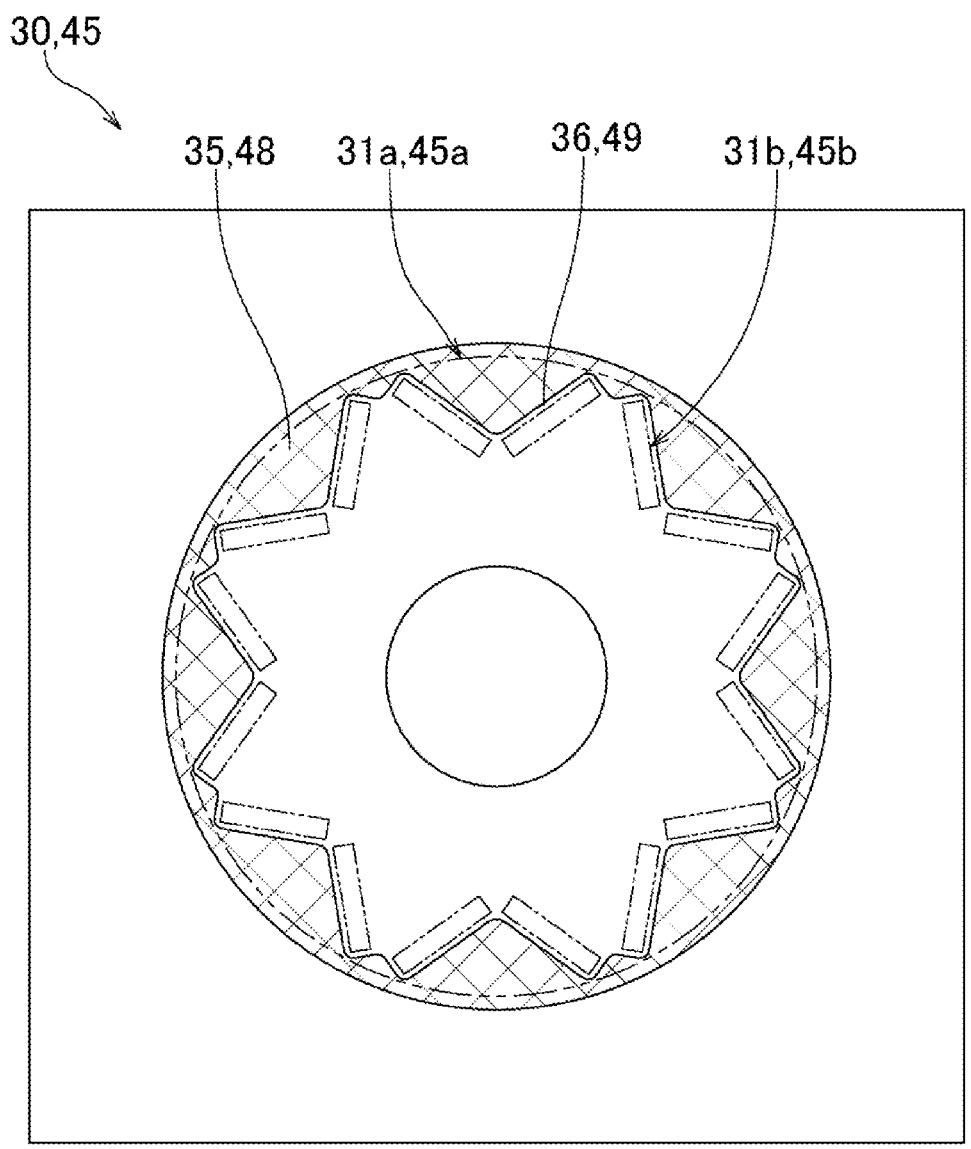
FIG. 12 is a plan view of another jig or a bottom view of another auxiliary plate in the core part manufacturing apparatus according to each embodiment of the present disclosure.

However, the present disclosure is not limited thereto, and as illustrated in FIG. 12, the relief portion 35 (the relief portion 48 of the plate portion 31) of the jig 30 may be provided in a peripheral portion that is at least a contact surface outer peripheral side of the non-contact region 31b (the non-contact region 45b) in the contact surface 31a (the contact surface 45a), and the remaining portion 36 (the remaining portion 49) that does not become the relief portion 35 (the relief portion 48) may be configured to remain in an edge shape along at least the contact surface outer peripheral side of the non-contact region 31b (the non-contact region 45b).

Also in this case, the remaining portion 36 (the remaining portion 49) located on the outer peripheral side of the non-contact region 31b (the non-contact region 45b) is strongly brought into close contact with the end surface of the iron core body 11, and the remaining portion 36 (the remaining portion 49) blocks the molten resin 81 that will advance from the magnet insertion hole 11b to the outer peripheral side of the iron core body 11, so that the molten resin 81 does not leak to the outer peripheral side of the iron core body 11 from between the remaining portion 36 (the remaining portion 49) and the end surface of the iron core body 11, and in the iron core body 11 in which the molten resin 81 is solidified, similarly to each embodiment, it is possible to reliably prevent the cured burr of the leaked resin from being in a state of protruding from the outer periphery of the iron core body 11.

In particular, the remaining portion 36 (the remaining portion 49) that does not become the relief portion 35 (the relief portion 48) is disposed on the inner peripheral side of the iron core body 11 with respect to the magnet insertion hole 11b, so that it is possible to suppress an indentation on the end surface of the iron core body 11, which is likely to occur at the boundary between the relief portion 35 (the relief portion 48) and the remaining portion 36 (the remaining portion 49), on the inner peripheral side while suppressing the leakage of the molten resin 81 to the outer peripheral side where the influence of the burr is large. Further, the area for processing the relief portion 35 (the relief portion 48) of the jig 30 (the plate portion 31) is reduced, and a processing cost of the jig 30 (the plate portion 31) can be reduced.

The auxiliary plate 45 may be omitted by applying the contact surface 45a of the auxiliary plate 45 illustrated in FIG. 12 to the contact surface of the upper mold that is in contact with the end surface of the iron core body 11.

Further, in the core part manufacturing apparatus 1 according to each embodiment, the cross-sectional shape of the relief portion provided on the plate portion 31 of the jig 30 or the auxiliary plate 45 is not particularly specified except that the relief portion is not in contact with the end surface of the iron core body 11. In addition, as illustrated in FIG. 13, the relief portion 51 may be provided such that a corner portion of an end portion of the remaining portion 52 adjacent to the relief portion 51 has a chamfered shape or a round chamfered shape.

When the relief portion is provided, the contact surface pressure of the remaining portion to the iron core body end surface is increased, the resin can be reliably prevented from coming off, and an influence from the remaining portion strongly pressed against the end surface on the iron core body end surface is easily exerted. However, as illustrated in FIG. 13, since the corner portion at the end portion of the remaining portion 52 has a chamfered shape, the end surface of the iron core body 11 is less likely to be affected by the remaining portion, for example, the indentation caused by the corner portion at the end portion of the remaining portion is less likely to occur in the end surface, and the injection step can be executed so as to sufficiently satisfy the required quality of the iron core body 11 after injection and filling of the resin.

As described in each embodiment, in the core part manufacturing apparatus 1 according to the present disclosure, the relief portion is provided in the plate portion 31 of the jig 30 or the auxiliary plate 45, so that the contact area between the plate portion 31 or the auxiliary plate 45 and the iron core body 11 can be reduced and the contact surface pressure can be increased. By making the contact surface pressure larger than a pressure applied from the resin to the plate portion 31 or the auxiliary plate 45 at the time of injection, the leakage of the resin can be effectively suppressed.

In the core part manufacturing apparatus 1 according to each embodiment, the case where the iron core body 11 is carried to the injection mechanism portions 20, 25 using the jigs 30, 37, and the molten resin 81 is injected while the iron core body 11 is placed on the jigs 30, 37 was described. However, without using the jigs 30, 37, the iron core body 11 can be directly sandwiched between the upper molds 21, 26 and the lower molds 22, 27 of the injection mechanism portions 20, 25. In this case, in the first embodiment, the contact surface 31a is an upper surface of the lower mold 22, and in the second embodiment, the contact surface 45a is a lower surface of the upper mold 26.

What is claimed is:

1. A core part manufacturing method for manufacturing a core part that is formed as a rotor of a rotary electric machine, the core part manufacturing method comprising:
providing an iron core body formed by laminating a plurality of thin plates made of a magnetic metal material;
sandwiching and pressing the iron core body with an upper mold and a lower mold; and
injecting a molten resin from a side on one end surface of the iron core body in a laminating direction of the thin plates into a plurality of space portions provided in the iron core body in a state where the iron core body is sandwiched and pressed, wherein
in an operation of injecting the resin,
a contact surface that is in contact with the one end surface of the iron core body is provided on an opposite side to a side where the resin is injected into the space portions of the iron core body,
the contact surface includes: a non-contact region that faces the space portions of the iron core body; a relief portion that is recessed without contacting to the one end surface; and a remaining portion that is adjacent to the non-contact region and does not become the relief portion, and
the remaining portion is disposed in the contact surface on an outer peripheral side from the non-contact region, and the relief portion is disposed further in the contact surface on an outer peripheral side from the remaining portion.

2. The core part manufacturing method according to claim 1, wherein
the iron core body is supported from below with a plate portion of a jig having the contact surface on an upper surface thereof, and
the operation of injecting the resin includes filling the molten resin from a side on an upper end surface of the iron core body.

3. The core part manufacturing method according to claim 2, wherein
a plate-shaped auxiliary plate is provided abutably on the upper end surface of the iron core body and the upper mold, and
the operation of injecting the resin includes filling the resin from the side on the upper end surface of the iron core body into the space portions through the auxiliary plate that is in contact with the upper end surface of the iron core body.

4. The core part manufacturing method according to claim 1, wherein
the contact surface is provided on an upper surface of the lower mold, and
the operation of injecting the resin includes filing the molten resin from a side on an upper end surface of the iron core body.

5. The core part manufacturing method according to claim 1, wherein
the contact surface is provided on a lower surface of the upper mold, and
the operation of injecting the resin includes filling the molten resin from a side on a lower end surface of the iron core body.

6. The core part manufacturing method according to claim 5, wherein
the iron core body is supported from below with a plate portion of a jig, and
the operation of injecting the resin includes filling the resin from the side on the lower end surface of the iron core body into the space portions through the plate portion of the jig that is in contact with the lower end surface of the iron core body.

7. The core part manufacturing method according to claim 1, wherein
a plate-shaped auxiliary plate is provided abutably on an upper end surface of the iron core body and the upper mold, the contact surface is provided on a lower surface of the auxiliary plate, and the operation of injecting the resin includes filling the molten resin from a side on a lower end surface of the iron core body in the laminating direction of the thin-plate.

8. The core part manufacturing method according to claim 1, wherein
in the operation of injecting the resin,
the contact surface is provided in a circumference of the non-contact region in an arrangement that the relief portion is in parallel to a contour of the non-contact region, such that the remaining portion surrounds the non-contact region per one or plural non-contact region.

9. The core part manufacturing method according to claim 1, wherein
the contact surface has a corner chamfered shape or a round chamfered shape at a corner portion of an end portion of the remaining portion adjacent to the relief portion.

10. A core part manufacturing apparatus for manufacturing a core part that is formed as a rotor of a rotary electric machine by injecting a resin into a plurality of space portions provided in an iron core body formed by laminating a plurality of thin plates made of a magnetic metal material, the core part manufacturing apparatus comprising:
an injection mechanism portion configured to inject the molten resin into the space portions of the iron core body in a state of sandwiching and pressing the iron core body with a pair of molds in a laminating direction of the thin-plate; and
a jig that is carried in and out together with the iron core body, and sandwiched and pressed between the pair of molds while supporting the iron core body, wherein
the injection mechanism portion is configured to inject the resin from a side on an upper end surface of the iron core body in the laminating direction of the thin-plate into the space portions having a through-hole shape continuous in the laminating direction,
the jig includes a plate portion configured to support the iron core body in a state where the jig is in contact with a lower end surface of the iron core body in the laminating direction,
in a state where the resin is injected,
the plate portion includes: a contact surface that is in contact with one end surface of the iron core body on an opposite side to a side where the resin is injected into the space portions of the iron core body,
the contact surface includes: a non-contact region that faces the space portions of the iron core body; a relief portion that is recessed without contacting to the one end surface; and a remaining portion that is adjacent to the non-contact region and does not become the relief portion, and
the remaining portion is disposed in the contact surface on an outer peripheral side from the non-contact region, and the relief portion is disposed further in the contact surface on an outer peripheral side from the remaining portion.

11. The core part manufacturing apparatus according to claim 10, wherein
in a state where the resin is injected,
the contact surface is provided in a circumference of the non-contact region in an arrangement that the relief portion is in parallel to a contour of the non-contact region, such that the remaining portion surrounds the non-contact region per one or plural non-contact region.

12. The core part manufacturing apparatus according to claim 10, wherein
the contact surface has a corner chamfered shape or a round chamfered shape at a corner portion of an end portion of the remaining portion adjacent to the relief portion.

13. A core part manufacturing apparatus for manufacturing a core part that is formed as a rotor of a rotary electric machine by injecting a resin into a plurality of space portions provided in an iron core body formed by laminating a plurality of thin plates made of a magnetic metal material, the core part manufacturing apparatus comprising:
an injection mechanism portion configured to inject the molten resin into the space portions of the iron core body in a state of sandwiching and pressing the iron core body with a pair of an upper mold and a lower mold in a laminating direction of the thin-plate;
a plate-shaped auxiliary plate provided abutably on an upper end surface of the iron core body in the laminating direction of thin-plate and the upper mold; and
a jig that is carried in and out together with the iron core body, and sandwiched and pressed between the pair of the upper mold and the lower mold while supporting the iron core body, wherein
the injection mechanism portion is configured to inject the resin from a side on a lower end surface of the iron core body in the laminating direction of the thin-plate into the space portions having a through-hole shape continuous in the laminating direction,
the jig includes a plate portion configured to support the iron core body in a state where the jig is in contact with the lower end surface of the iron core body in the laminating direction,
in a state where the resin is injected,
the auxiliary plate includes: a contact surface that is in contact with one end surface of the iron core body on an opposite side to a side where the resin is injected into the space portions of the iron core body,
the contact surface includes: a non-contact region that faces the space portions of the iron core body; a relief portion that is recessed without contacting to the one end surface;
and a remaining portion that is adjacent to the non-contact region and does not become the relief portion, and
the remaining portion is disposed in the contact surface on an outer peripheral side from the non-contact region, and the relief portion is disposed further in the contact surface on an outer peripheral side from the remaining portion.

14. The core part manufacturing apparatus according to claim 13, wherein
the injection mechanism portion is configured to inject the resin from the side on the lower end surface of the iron core body to which the plate portion of the jig abuts into the space portions of the iron core body through the plate portion.

* * * * *